United States Patent
Soryal

(10) Patent No.: US 12,026,269 B2
(45) Date of Patent: Jul. 2, 2024

(54) IMAGE PROCESSING DEVICE SECURITY

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 457 days.

(21) Appl. No.: 17/483,255

(22) Filed: Sep. 23, 2021

(65) Prior Publication Data

US 2023/0086382 A1 Mar. 23, 2023

(51) Int. Cl.
*G06F 21/62* (2013.01)
*G06F 9/455* (2018.01)
*G06F 18/24* (2023.01)
*G06K 15/02* (2006.01)

(52) U.S. Cl.
CPC ...... *G06F 21/6218* (2013.01); *G06F 9/45558* (2013.01); *G06F 18/24* (2023.01); *G06K 15/027* (2013.01)

(58) Field of Classification Search
CPC .... G06F 21/6218; G06F 21/53; G06F 21/554; G06F 21/606; G06F 9/45558; G06F 18/24; G06K 15/027; G06V 10/225; G06V 10/764; G06V 20/698
See application file for complete search history.

(56) References Cited

U.S. PATENT DOCUMENTS

| | | |
|---|---|---|
| 5,875,249 A | 2/1999 | Mintzer et al. |
| 7,093,121 B2 | 8/2006 | Barton et al. |
| 7,277,193 B2 | 10/2007 | Bunn et al. |
| 7,881,519 B2 | 2/2011 | Jones et al. |
| 7,971,059 B2 | 6/2011 | Calman et al. |
| 8,437,021 B2 | 5/2013 | Yokoyama |
| 8,763,128 B2 | 6/2014 | Lim et al. |

(Continued)

FOREIGN PATENT DOCUMENTS

| | | |
|---|---|---|
| EP | 3 049 985 B1 | 4/2020 |
| WO | 2018/201730 A1 | 11/2018 |

OTHER PUBLICATIONS

Cohen et al., "MalJPEG: Machine Learning Based Solution for the Detection of Malicious JPEG Images", IEEE Access, vol. 8, Jan. 23, 2020, pp. 19997-20011.

(Continued)

*Primary Examiner* — Han Yang
(74) *Attorney, Agent, or Firm* — Guntin & Gust, PLC; Miyoung Shin

(57) ABSTRACT

Image processing device security is provided herein. A method can include assembling, by a first system comprising a processor using a first virtual machine enabled via the first system, raw input data captured by an image capture device from an input image, resulting in assembled input data; generating, by the first system using a second virtual machine that is enabled via the first system and distinct from the first virtual machine, an output image from the assembled input data; reading, by the first system in response to the generating, the output image; and preventing, by the first system, a second system, distinct from the first system, from accessing the output image in response to the reading resulting in execution of unauthorized instructions at the first system.

20 Claims, 10 Drawing Sheets

(56) References Cited

U.S. PATENT DOCUMENTS

| | | | |
|---|---|---|---|
| 9,021,249 B2 | 4/2015 | Jiang et al. | |
| 9,270,689 B1 | 2/2016 | Wang et al. | |
| 9,454,677 B1 | 9/2016 | Sinclair et al. | |
| 9,591,019 B2* | 3/2017 | Cafasso | H04L 63/145 |
| 9,886,589 B2 | 2/2018 | Polcha, Sr. et al. | |
| 10,198,554 B2* | 2/2019 | Knoplioch | G16H 30/20 |
| 10,789,389 B2 | 9/2020 | Wise | |
| 2007/0121155 A1 | 5/2007 | Machiyama | |
| 2012/0167206 A1 | 6/2012 | Reetz-lamour et al. | |
| 2019/0268384 A1 | 8/2019 | Hu et al. | |
| 2020/0349257 A1* | 11/2020 | Saffar | G06F 21/563 |
| 2021/0185067 A1* | 6/2021 | Sureda | H04L 63/1416 |

OTHER PUBLICATIONS

Sharma et al., "Robust and Secure Multiple Watermarking for Medical Images", Wireless Personal Communications, Springer, vol. 92, No. 4, 2017, pp. 1611-1624.

Cao et al., "Medical image security in a HIPAA mandated PACS environment", Computerized Medical Imaging and Graphics, vol. 27, 2003, pp. 185-196.

Moshchuk et al., "SpyProxy: Execution-based Detection of Malicious Web Content", 16th USENIX Security Symposium, 2007, pp. 27-42.

Kyung et al., "HONEYPROXY: Design and Implementation of Next-Generation Honeynet via SDN", IEEE Conference on Communications and Network Security (CNS), IEEE, 2017, 9 pages.

Paul et al., "Defending Medical Image Diagnostics against Privacy Attacks using Generative Methods: Application to Retinal Diagnostics", URL: https://arxiv.org/pdf/2103.03078v1.pdf, 2021, pp. 1-11.

"Automating malware scanning for documents uploaded to Cloud Storage", cloud.google.com, retrieved on Aug. 20, 2021, 8 pages.

"What is a secure web gateway (SWG)?", cloudflare.com, retrieved on Aug. 20, 2021, 3 pages.

Yong, Ed, "These Scientists Took Over a Computer by Encoding Malware in DNA", The Atlantic, Science, Aug. 10, 2017, pp. 1-4.

Greenberg, Andy, "Biohackers Encoded Malware in a Strand of DNA", URL: https://www.wired.com/story/malware-dna-hack/, Oct. 8, 2017, pp. 1-4.

* cited by examiner

IMAGE PROCESSING DEVICE SECURITY

TECHNICAL FIELD

The present disclosure relates to image processing, and, in particular, to techniques for improving security of image processing devices.

BACKGROUND

Advancements in computing technology have led to increases in the efficiency of gathering and processing information. For instance, an image processing system can facilitate the extraction and storage of features of an object represented in an image in a manner that is significantly faster and/or more efficient than manual identification and entry of those features. Image processing systems are utilized for a wide range of tasks, such as genetic sequencing, license plate recognition, barcode reading, and the like. In building and maintaining an image processing system, it is desirable to implement techniques to secure the system, e.g., against potential malicious attacks.

DETAILED DESCRIPTION

Figure 1:
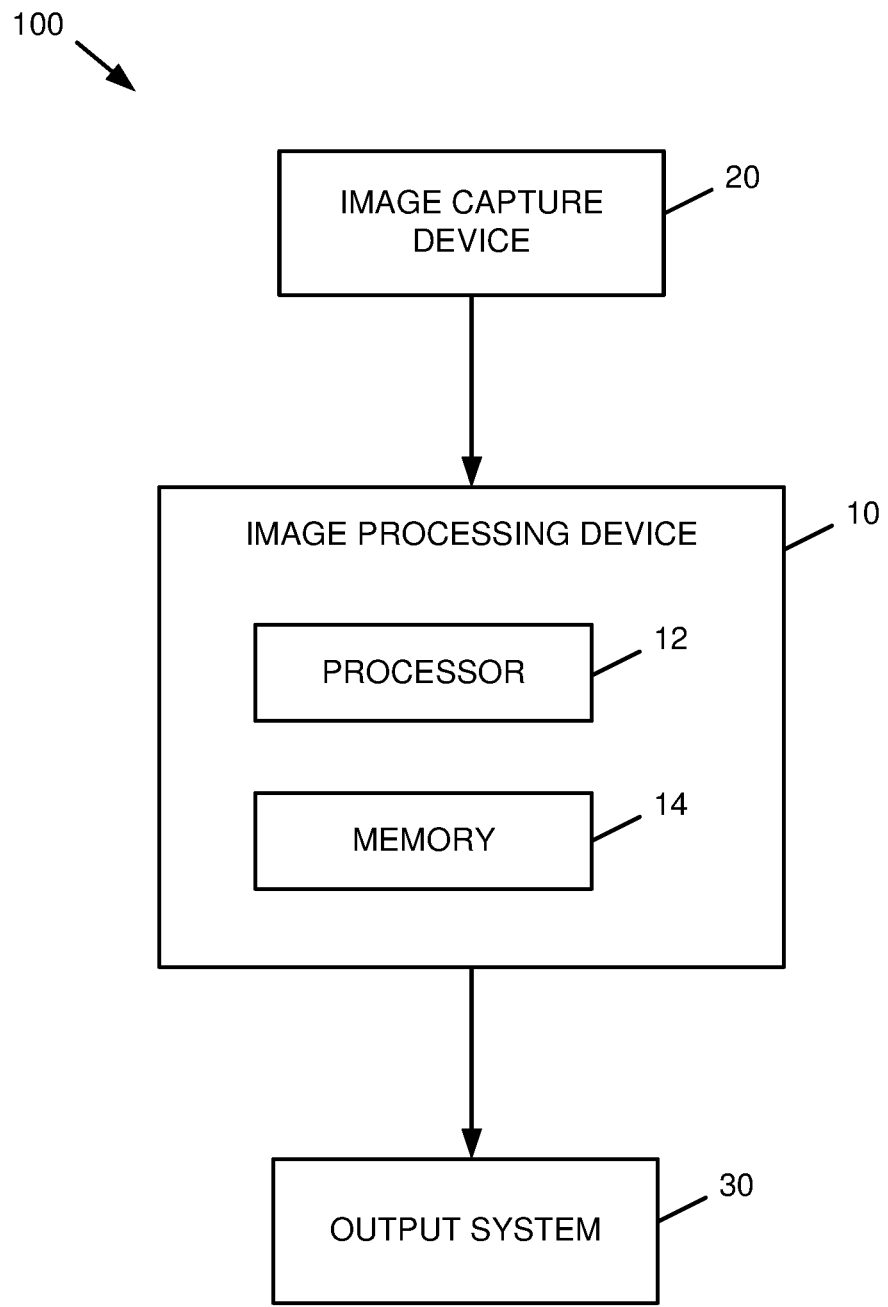
FIG. 1 is a block diagram of a system that facilitates image processing device security in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include assembling, by a first system including a processor using a first virtual machine enabled via the first system, raw input data captured by an image capture device from an input image, resulting in assembled input data. The method can further include generating, by the first system using a second virtual machine that is enabled via the first system and distinct from the first virtual machine, an output image from the assembled input data. The method can also include reading, by the first system in response to the generating, the output image. The method can additionally include preventing, by the first system, a second system, distinct from the first system, from accessing the output image in response to the reading resulting in execution of unauthorized instructions at the first system.

In another aspect, a system as described herein can include a processor and a memory that stores executable instructions that, when executed by the processor, facilitate performance of operations. The operations can include assembling, by a first virtual machine enabled via the system, raw data captured by an image capture device from an input image, resulting in assembled image data. The operations can also include constructing, by a second virtual machine that is enabled via the system and distinct from the first virtual machine, an output image from the assembled image data. Additionally, the operations can include reading the output image in response to the output image being constructed. The instructions can further include preventing an external system, distinct from the system, from accessing the output image in response to determining that reading the output image results in execution of unauthorized instructions.

In a further aspect, a non-transitory machine-readable medium as described herein can include executable instructions that, when executed by a processor, facilitate performance of operations. The operations can include causing a first virtual machine instance to assemble raw input data captured by an image capture device from an input image, resulting in assembled data; causing a second virtual machine instance, distinct from the first virtual machine instance, to construct an output image from the assembled data; in response to the second virtual machine instance constructing the output image, reading the output image; and preventing access by a destination system to the output image in response to determining that reading the output image results in execution of unauthorized program code.

Referring first to FIG. 1, a system 100 that facilitates image processing device security is illustrated. System 100 as shown by FIG. 1 includes an image processing device 10, which can process data received from an image capture device 20 for use by an output system 30. The image capture device 20 can be a camera, a scanner, an object such as a telescope or microscope with image capture capabilities, and/or any other device suitable for capturing an image of an object. In an aspect, data received by the image processing device 10 from the image capture device 20 can be raw, unassembled data corresponding to an object and/or an input image. In response to receiving raw data from the image capture device 20, the image processing device 10 can process the raw data into output images and/or other structured data, which can then be provided to the output system 30.

In an aspect, the output system 30 can include one or more databases, servers, or the like that can store output images processed by the image processing device 10 and/or data associated with output images. In some implementations, the output system 30 can perform feature extraction and/or other types of analysis on output images received by the image processing device 10 to collect information represented by the output images. Information obtained by the output system 30 in this manner can be maintained by the output system 30 in addition to, or in place of, the output images from the image processing device 10.

Figure 2:
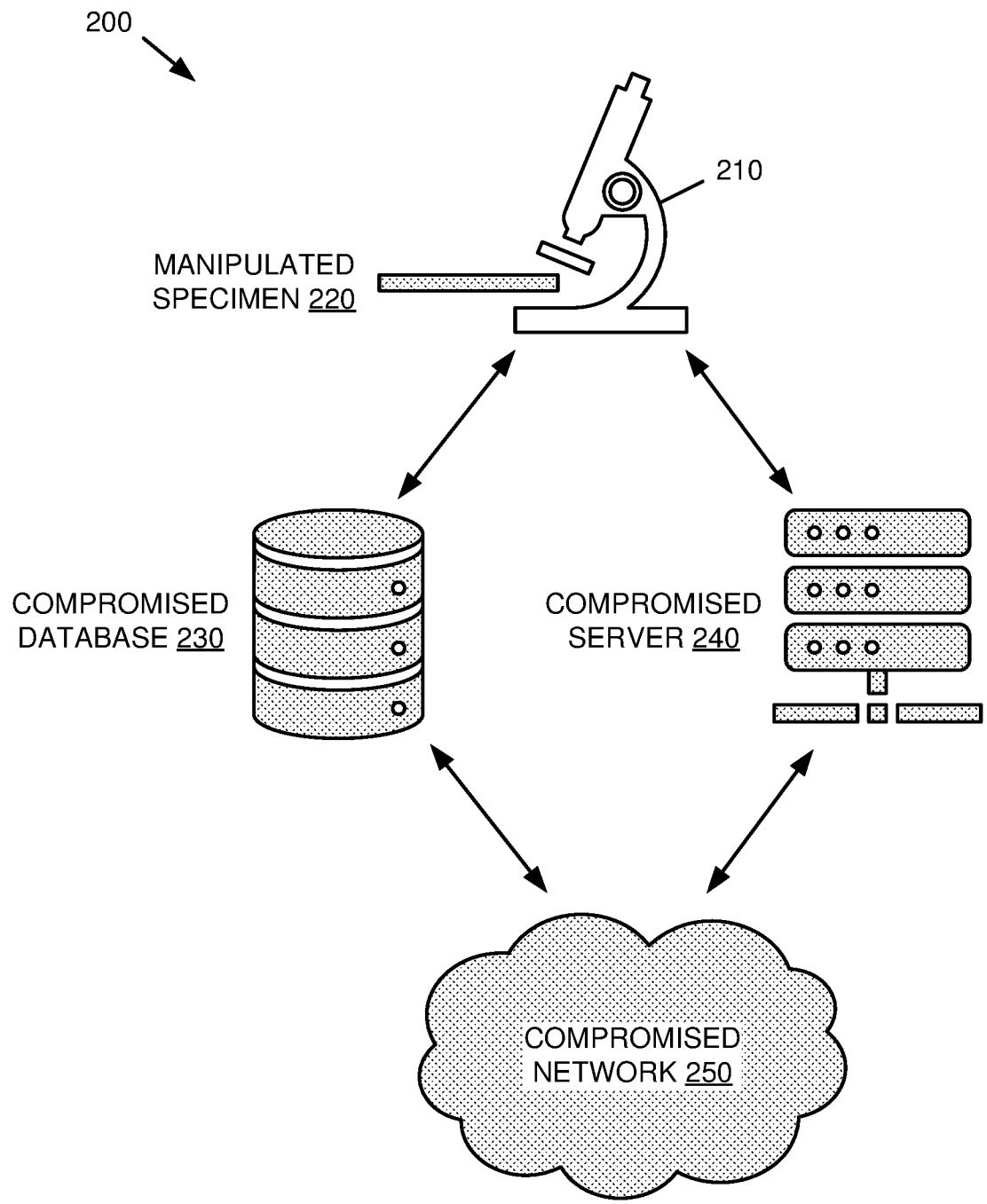
FIG. 2 is a diagram that depicts an example manipulated specimen attack that can be mitigated by various aspects described herein.

While the image processing device 10 is shown in FIG. 1 as a single device, it is noted that the functionality of the image processing device 10 as described herein could be distributed among multiple distinct devices that can communicate with each other, e.g., via a wired or wireless network and/or by other means. Also or alternatively, the functionality of the image processing device 10 and the image capture device 20 could be performed via one or more common devices, e.g., as described below with respect to FIG. 2. Other implementations could also be used.

The image processing device 10 shown in system 100 can include a processor 12 and a memory 14, which can be utilized to facilitate various functions of the image processing device 10. For instance, the memory 14 can include a non-transitory computer readable medium that contains computer executable instructions, and the processor 12 can execute instructions stored by the memory 14. For simplicity of explanation, various actions that can be performed via the processor 12 and the memory 14 of the image processing device 10 are shown and described below with respect to various logical components. In an aspect, the components described herein can be implemented in hardware, software, and/or a combination of hardware and software. For instance, a logical component as described herein can be implemented via instructions stored on the memory 14 and executed by the processor 12. Other implementations of various logical components could also be used, as will be described in further detail where applicable.

In an aspect, the processor 12 and the memory 14 of the image processing device 10 can be utilized as described herein to protect image reader devices, medical devices, or the like against malicious attacks that aim to alter system configurations to create security gaps via reading and analyzing legitimate, but manipulated, objects. An example of such an attack in the context of a medical imaging system is shown by diagram 200 in FIG. 2. As shown in diagram 200, an image capture device 210 such as a microscope, a camera, etc., can generate images of a medical specimen for further processing by other devices in the system. By way of example, the system shown by diagram 200 could be utilized to sequence and/or analyze samples of genetic material such as deoxyribonucleic acid (DNA) or ribonucleic acid (RNA), facilitate testing of blood or tissue samples, detect for the presence of viruses or other pathogens in a test specimen, or the like.

As further shown by diagram 200, a manipulated specimen 220, a specimen that has been manipulated by a malicious actor to contain encoded software, can be provided to the image capture device 210. By way of example, a DNA sample could be manipulated by encoding malicious software into the physical strands of DNA within the sample. As a result, when the manipulated specimen 220 is analyzed by a gene sequencer and/or other tools provided by the system, e.g., tools provided via one or more databases 230, servers 240, or the like, the resulting data can become a program that corrupts the gene sequencing software and takes control of the databases 230, servers 240, and/or other devices of the system. These compromised devices could then, in turn, be used to infect or otherwise compromise the network 250 on which the system operates. In the case of a medical or hospital system, malicious actors could then utilize the compromised network 250 to gain access to the computer system of the hospital in order to expose patient records or other confidential information, open ports and/or otherwise enable further system access, disable security measures present on the network 250, and/or perform other malicious actions.

While the specific example given above involving a manipulated genetic sequence is not presently a common type of attack, it is expected that this type of attack will become more common in the future as DNA sequencing, virus detection, and other techniques become more commonplace and powerful. Further, similar types of attacks to those illustrated by diagram 200 could be performed in existing systems using other types of manipulated images, e.g., by encoding malicious program code into calibration graphics used for printers or scanners, barcodes or quick response (QR) codes, and/or any other type of image into which encoded data corresponding to malicious commands could be inserted.

Figure 3:
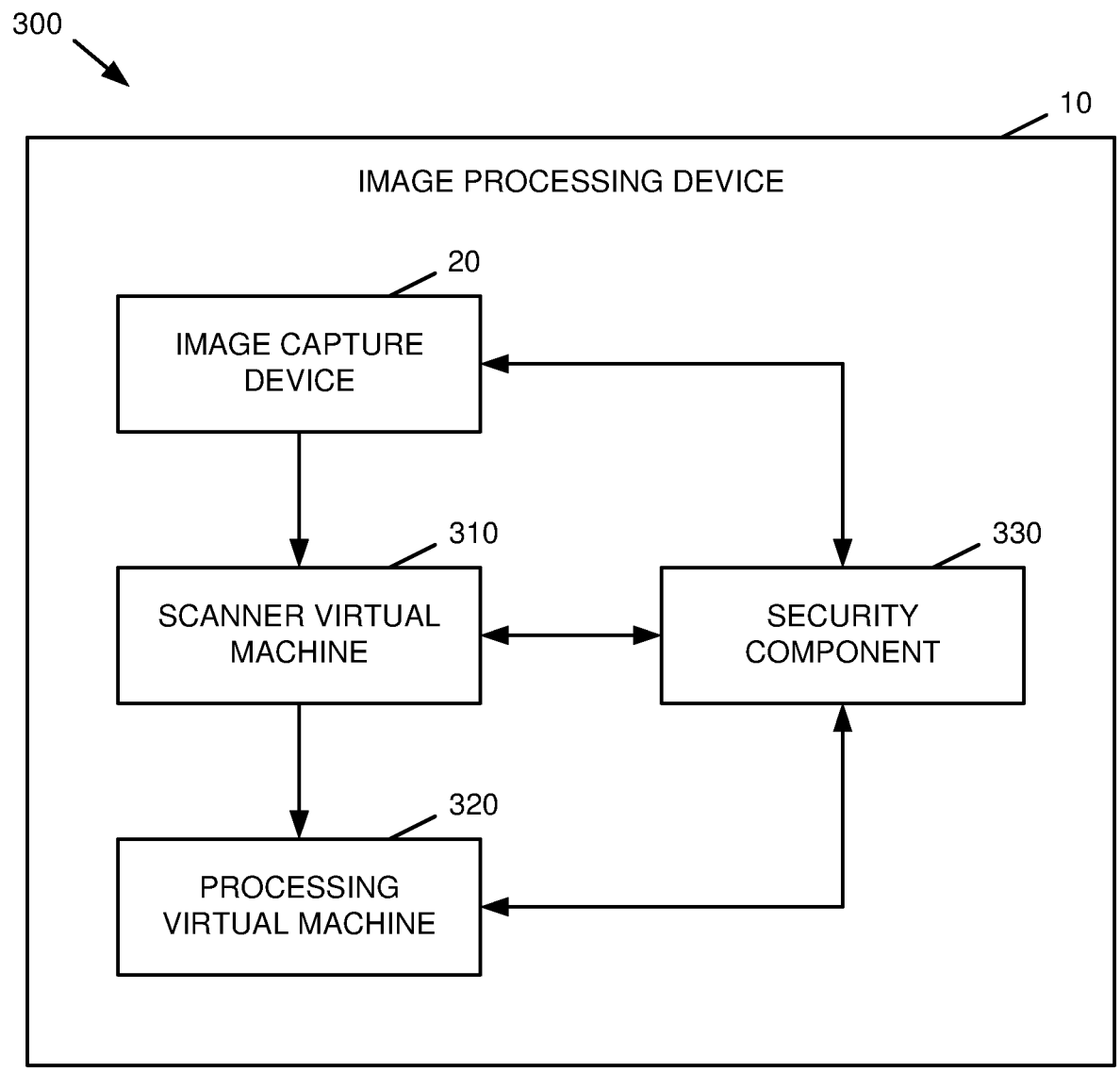
FIG. 3 is a block diagram of a system that facilitates compartmentalized image processing with enhanced security in accordance with various aspects described herein.

With reference now to FIG. 3, a block diagram of a system 300 that facilitates compartmentalized image processing with enhanced security is illustrated. Repetitive description of like elements employed in other embodiments described herein is omitted for brevity. System 300 as shown in FIG. 3 includes an image processing device 10 that can operate in a similar manner to that described above with respect to FIG. 1. In the implementation shown by FIG. 3, the image capture device 20 is implemented as part of the image processing device 10 and can communicate with other components of the image processing device 10, e.g., via a system bus or other means. It is noted, however, that the image capture device 20 could be implemented separately from the image processing device 10, e.g., as shown in FIG. 1.

As additionally shown in FIG. 3, the image processing device 10 of system 300 utilizes a compartmentalized computing architecture in which respective image processing steps are implemented via multiple separate virtual machine (VM) instances running on and/or otherwise enabled via the image processing device 10. By doing so, the image processing device 10 can control the inputs and/or outputs to each of the VM instances and facilitate correlation of these inputs and/or outputs between multiple systems, thereby enhancing the security of the image processing device 10 as will be described in further detail below. In various implementations, the VM instances enabled via the image processing device 10 as described below can be permanent instances, or alternatively they can be added and/or removed as desired for a given processing workflow.

The VM instances enabled via the image processing device 10 as shown in system 300 can include a first virtual machine instance, referred to as a scanner virtual machine (scanner VM or SVM) 310, which can assemble raw input data captured by the image capture device 20 from an input image, object, specimen, etc. In an implementation, the image capture device 20 can be controlled via the SVM 310 to provide fragmented data feeds corresponding to the input image or specimen. These fragmented data feeds can then be assembled to form assembled image data inside the SVM 310. This assembled image data can then be sent to a second, distinct VM instance, referred to here as a processing VM or PVM 320. In an aspect, the PVM 320 can process the results of the SVM 310, e.g., to generate and/or construct an output image corresponding to the input image or specimen provided to the image capture device 20, and/or to perform other processing steps.

As further shown by FIG. 3, the image processing device 10 of system 300 can further include a security component 330, which can examine the outputs of the image capture device 20, SVM 310, PVM 320, and/or other components of the image processing device 10 to ensure that the individual components of the image processing device generate expected outputs, e.g., outputs that are free of unauthorized instructions or program code. Respective techniques that can be employed by the security component 330 to ensure the security of data generated within the image processing device 10 are described in further detail below with respect to FIGS. 5-7. Additionally, as will be described in further detail below with respect to FIG. 8, the security component 330 can facilitate point-to-point encryption between the image capture device 20, SVM 310, and PVM 320. By doing so, the security component 330 can enforce isolation between the incoming data feed and the respective VM instances.

In an aspect, the security component 330 can additionally facilitate reading an output image, e.g., an output image generated by the PVM 320 based on assembled input data provided by the SVM 310. The security component 330 can utilize one or more techniques, e.g., as described below with respect to FIGS. 5-7, to determine whether reading the output image results in the execution of unauthorized instructions. If reading an output image does result in the performance of unauthorized operations, e.g., due to malicious instructions or commands being embedded into the specimen captured by the image capture device 20, the security component 330 can ensure that any device configuration changes or malicious instructions arising from reading the output image do not propagate to the operating system of the image processing device 10 and/or other hardware or software systems associated with the image processing device 10. For instance, the security component 330 can prevent an external system, such as the output system 30 shown in FIG. 1, from accessing the output image in response to determining that reading the output image results in execution of unauthorized instructions. Techniques that can be utilized by the security component 330 for managing access to image-related data between respective system components are described in further detail below with respect to FIG. 8.

By utilizing the security component 330 in combination with the SVM 310 and PVM 320 as shown in FIG. 3, the security of a computing environment associated with system 300 against malicious and/or other unauthorized instructions can be improved. For instance, a level of security provided by the image processing device 10 as shown in FIG. 3 can be greater than that of a system in which image capture and processing are performed by a single component. Other advantages, including other advantages that can improve the functionality of an underlying computing system, are also possible.

Figure 4:
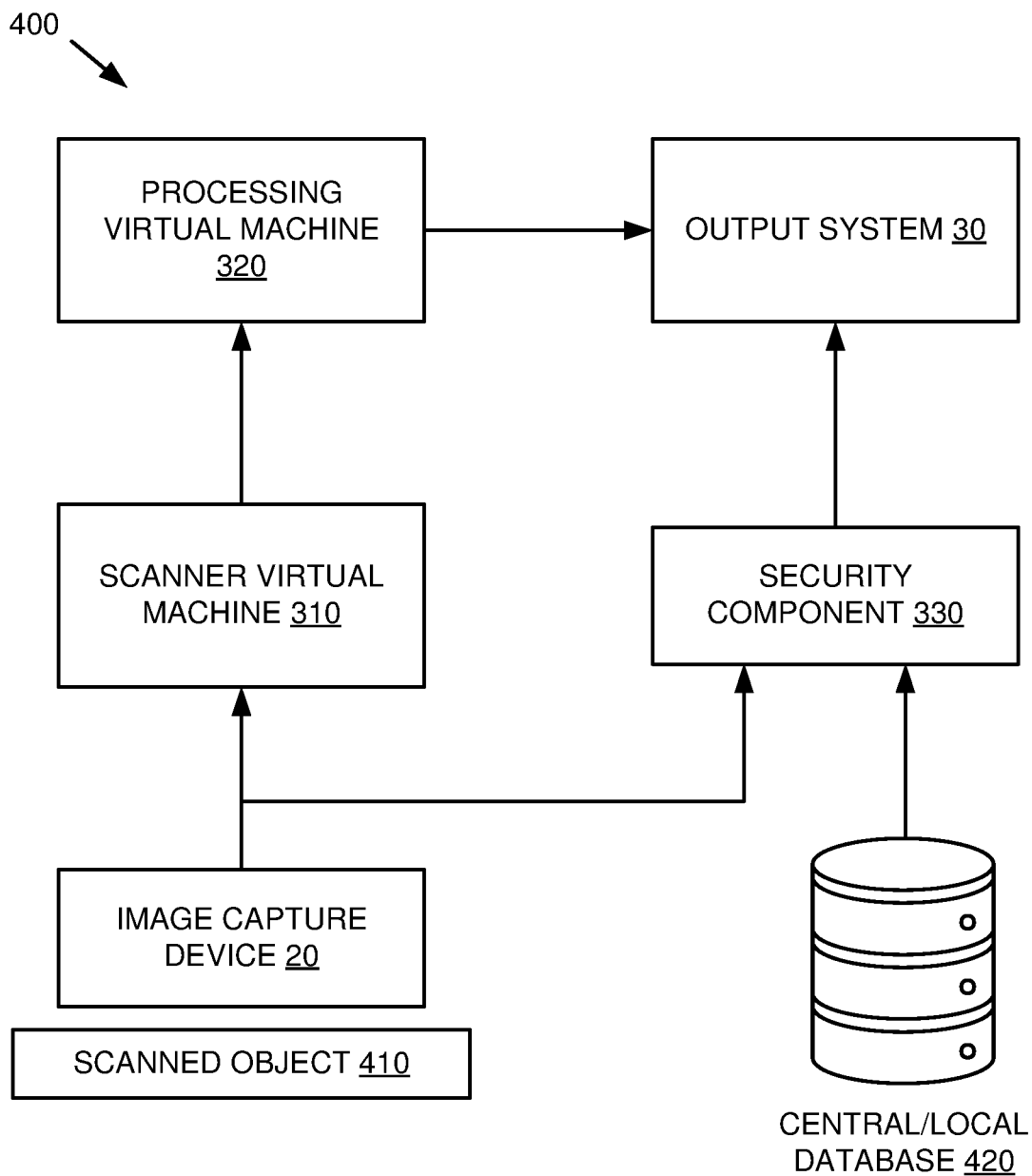
FIG. 4 is a block diagram of a system that facilitates secure processing of captured image data in accordance with various aspects described herein.

Referring now to FIG. 4, a block diagram of a system 400 that facilitates secure processing of captured image data is illustrated. Repetitive description of like elements employed in other embodiments described herein is omitted for brevity. As shown by system 400, an image capture device 20 (e.g., a camera, scanner, reader, etc.) can capture raw image data corresponding to a scanned object 410, such as a sample of genetic material, a blood or other medical sample, a QR code, or the like. As further shown by system 400, an SVM 310 can connect to the image capture device 20 to obtain the captured raw image data. In an implementation, the SVM 310 can obtain a live feed from the image capture device 20 by connecting to an operating system of the image capture device 20, and/or other associated software, in a similar manner to techniques that can be utilized by a software application running on a mobile device for obtaining access rights to a camera at the mobile device. Other suitable techniques generally known in the art could also be used.

In an implementation, the SVM 310 can be given administrator rights to the image capture device 20 and/or otherwise be authorized to analyze the output of the image capture device 20, e.g., as described above. The SVM 310 can then utilize these rights to assemble raw image data provided by the image capture device 20, e.g., as described above with respect to FIG. 3. During and/or after assembling the raw image data, the SVM 310 can sanitize the image data, e.g., by determining whether the image data appears to be within an expected range of results. As a simple, non-limiting example, if the scanned object 410 is expected to be a license plate, the SVM 310 can perform an initial screening of raw data obtained by the image capture device 20 determine whether the raw data appears to depict a license plate.

As further shown in system 400, the security component 330 can connect to the image capture device 20, e.g., in a similar manner to the SVM 310 as described above, and obtain a duplicate feed from the image capture device 20 (e.g., the same or a substantially similar feed as that provided to the SVM 310). The security component 330 can then utilize this duplicate feed to perform an initial screening of the raw data obtained by the image capture device 20 in addition to, or in place of, the SVM 310.

Figure 5:
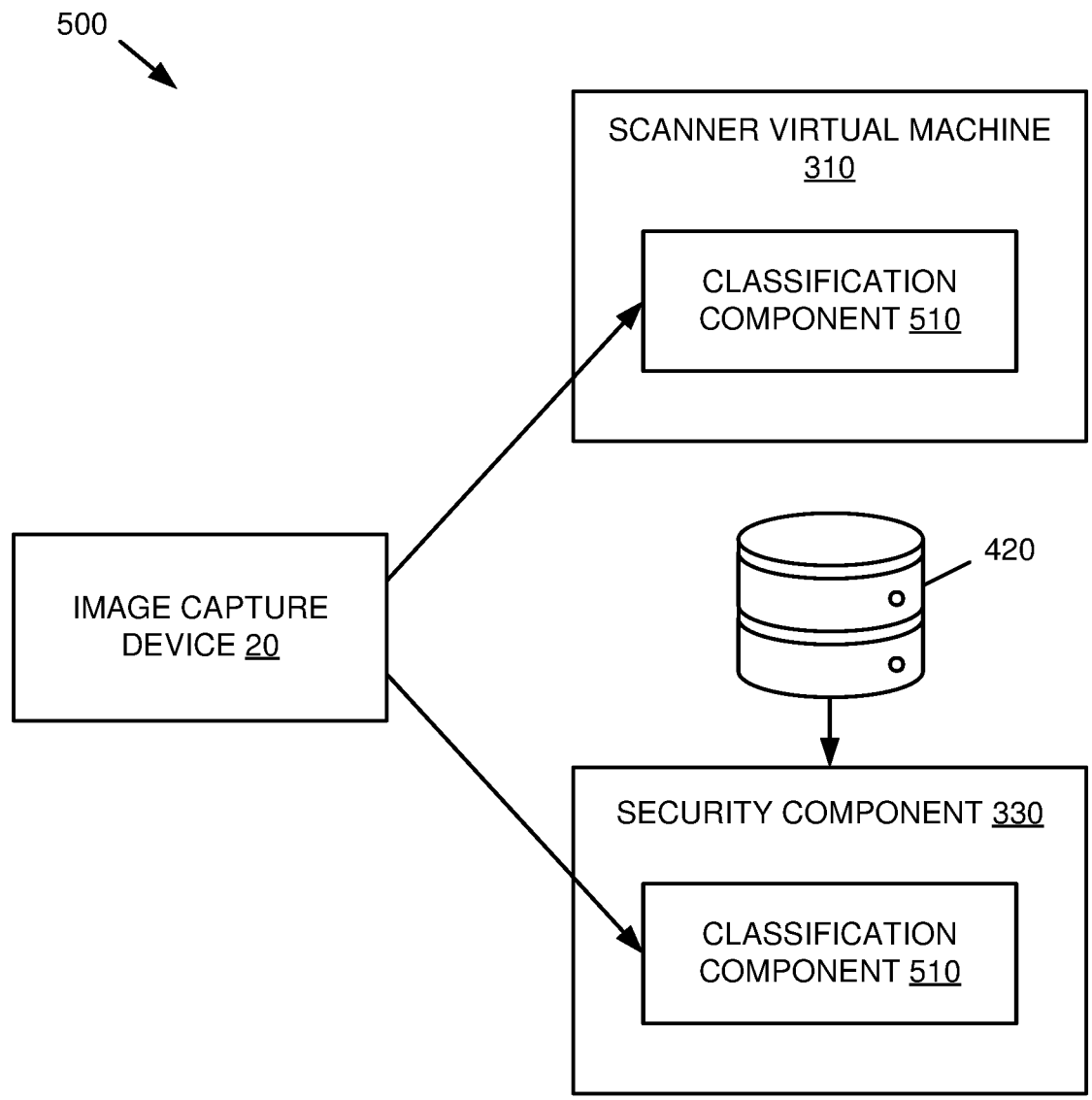
FIGS. 5-7 are block diagrams of respective systems that facilitate manipulated specimen recognition in accordance with various aspects described herein.

An example technique that can be utilized for an initial screening of data obtained by an image capture device 20 is shown in further detail by system 500 in FIG. 5. As shown by FIG. 5, raw data captured by an image capture device 20 can be provided to a classification component 510 at the SVM 310 and/or the security component 330. The classification component 510, based on the provided raw data, can determine whether the data captured by the image capture device 20 belongs to an expected class and/or category of images. If the captured data does not conform to the expected image category, one or more appropriate actions can be taken. For instance, an alert can be sent to a system administrator or other system user. Also or alternatively, the PVM 320, output system 30, and/or other entities can be prevented from accessing the captured data.

While the classification components 510 shown at the SVM 310 and security component 330 in system 500, respectively, can utilize similar classification algorithms, the classification performed by the SVM 310 and the security component 330 can differ in scope in some implementations. For instance, the classification component 510 of the SVM 310 can perform basic initial classification based on local knowledge at the SVM 310, e.g., previous data captured by the same image capture device 20 and processed via the same SVM 310, anonymized medical data corresponding to patients of a medical facility in which the SVM 310 operates, etc. In contrast, the classification component 510 of the security component 330 can perform initial classification based on a broader base of knowledge, e.g., classification data provided via a central or local database 420, which can include data obtained from sources outside of the system in which the database 420 resides.

In an implementation in which the SVM 310 and security component 330 have access to non-overlapping sets of classification data, classification results from their respective classification components 510 could differ. By way of example, if a blood sample scanned by the image capture device 20 contains rare or abnormal properties that have not previously been observed at a medical facility associated with the image capture device 20, the classification component 510 of the SVM 310 could indicate that the blood sample is invalid based on its limited local knowledge, while the classification component 510 of the security component 330 could recognize the sample as valid due to knowledge of the abnormal properties present in the sample as provided by the database 420.

As a result of the potential differences described above between the respective classification components 510 shown in system 500, the SVM 310 and the security component 330 can be configured to take different actions in response to detecting a nonconformant sample. For instance, the SVM 310 could flag a nonconformant sample for further analysis and/or scrutiny, while the security component 330 could be more likely to prevent a nonconformant sample from being further analyzed. Also or alternatively, a classification result for a given sample produced via the security component 330 could be prioritized over a classification result for the same sample as produced by the SVM 310 in the event that the two results differ, e.g., due to the broader scope of information available to the security component 330. Other actions could also be taken in response to the classification results produced by the SVM 310 and/or the security component 330.

Returning to system 400 in FIG. 4, assembled data produced by the SVM 310 for a given scanned object 410 can be provided to the PVM 320 for further processing in response to the assembled data passing an initial classification screening as described above. For instance, the PVM 320 can generate an output image from the assembled data provided by the SVM 310. The PVM 320 can also perform feature analysis and/or other processing of the output image, or alternatively the output image can be provided to an external output system 30 for further processing and/or analysis.

Prior to the PVM 320 releasing an output image to the output system 30, the security component 330 can perform one or more actions to ensure the safety of the output image, e.g., as defined by the absence of unauthorized encoded instructions in the output image. As a first example, the security component 330 could perform image classification on the output image, e.g., in a similar manner to that described above with respect to FIG. 5, to determine whether the output image appears to depict an expected category of object, e.g., as opposed to computing commands.

Figure 6:
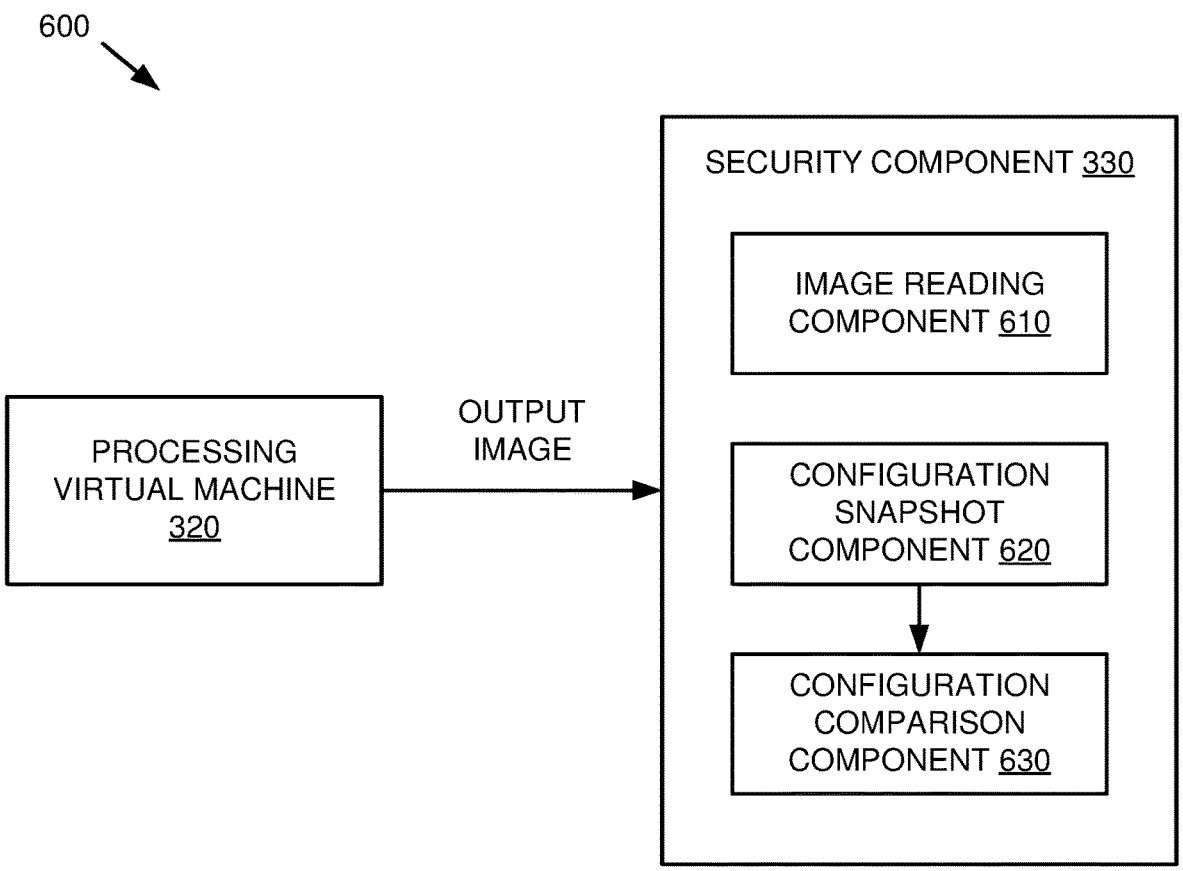

As another example as shown by system 600 in FIG. 6, the security component 330 can monitor for changes in system properties and/or configurations that are caused by reading the output image. In particular, the security component 330 shown in system 600 includes an image reading component 610 that facilitates reading the output image from the PVM 320. The security component 330 shown in system 600 also includes a configuration snapshot component 620 that can record configuration data associated with the security component 330 and/or an underlying system (e.g., a system as implemented via an image processing device 10). For instance, the configuration snapshot component 620 can obtain a first configuration snapshot prior to reading the output image via the image reading component 610 and a second configuration snapshot subsequent to reading the output image via the image reading component 610. The security component 330 can further include a configuration comparison component 630, which can determine whether reading the output image via the image reading component 610 resulted in execution of unauthorized instructions, e.g., based on a result of comparing the first and second configuration snapshots obtained by the configuration snapshot component 620.

In an implementation, the configuration snapshot component 620 can monitor respective system properties, such as processor load, memory usage, or the like, during a time period associated with reading a provided output image. The configuration comparison component 630 can compare the monitored system properties to established baselines for similar readings, e.g., as locally stored by the security component 330 and/or provided by a database 420 or other external data store. If, during reading a given output image, the system properties fall outside of the established baselines, the security component 330 can prevent access to the output image by other system components and/or take other preventative actions.

In another implementation, the snapshots collected by the configuration snapshot component 620 can include information such as system and/or networking interface configurations (e.g., the availability of respective network ports, the operational status of a firewall and/or other security measures, etc.), a list of currently running applications, dormant metadata (e.g., file sizes, last modified timestamps, etc.) for respective files stored by the system, and/or other suitable data. Accordingly, the security component 330 can prevent access to an output image in response to the configuration comparison component 630 detecting unexpected configuration changes have occurred between the snapshots.

In some implementations, the configuration comparison component 630 can be configured to account for benign changes in files and/or applications, e.g., increases in the size of a log file due to logging activity related to the output image, concurrent system updates or manual administrator actions, etc. In some cases, the security component 330 can respond to a suspected benign configuration change by prompting a system administrator or other user to confirm that the change was benign before performing other actions.

Figure 7:
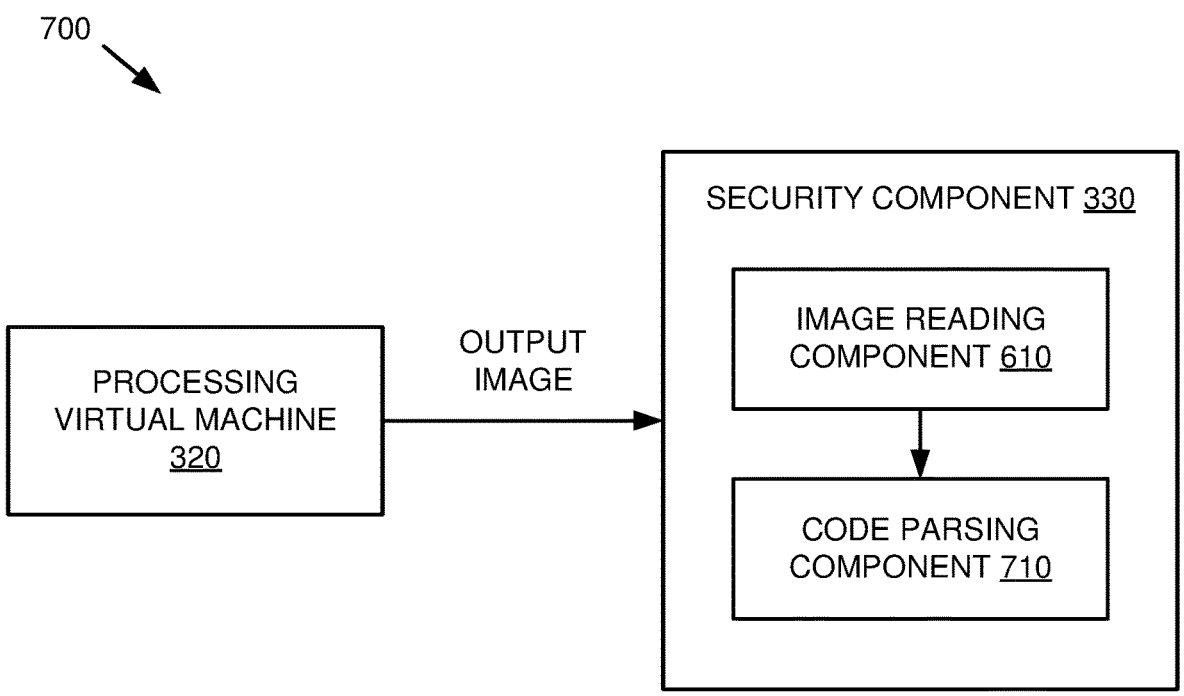

An additional example of malicious data detection that can be performed by the security component 330 involves analyzing an output image to detect the presence or absence of unauthorized program instructions, as shown by system 700 in FIG. 7. As shown by system 700, data corresponding to an output image read by the image reading component 610 can be analyzed by a code parsing component 710 to detect encoded data corresponding to program code or computing instructions present in the output image. By way of a non-limiting example involving genetic sequence data, the image reading component 610 can read a genetic sequence present in an output image provided by the PVM 320. Subsequently, the code parsing component 710 can determine whether the genetic sequence read by the image reading component 610 contains encoded data corresponding to unauthorized computing instructions. In the event that such instructions are found, the security component 330 can take one or more preventative actions, such as preventing an output system 30 and/or other system components from accessing the output image or the underlying genetic sequence. Other implementations are also possible.

Figure 8:
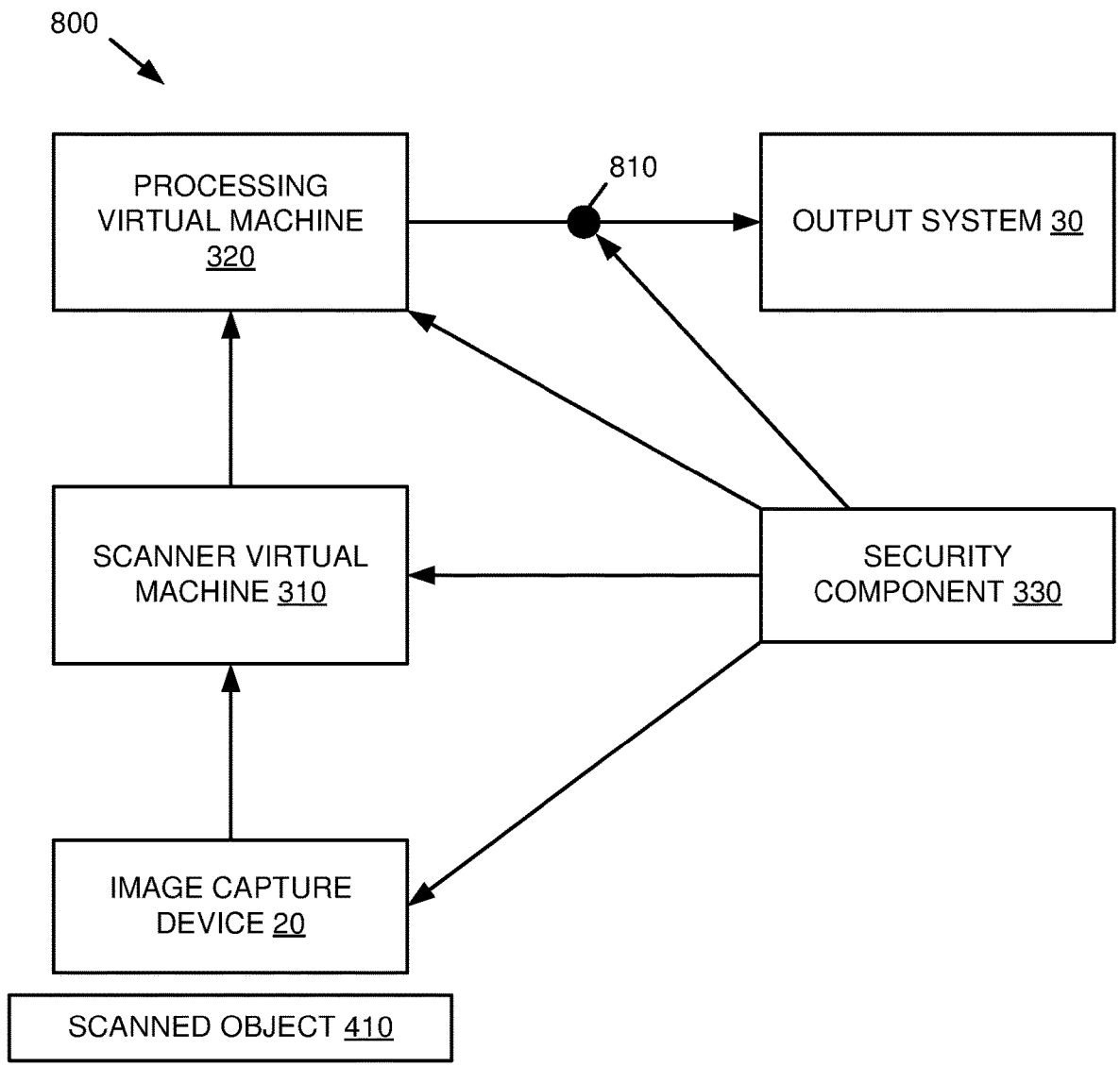
FIG. 8 is a block diagram of a system that facilitates encrypted data transfer between components of an image processing system in accordance with various aspects described herein.

Referring next to FIG. 8, a block diagram of a system 800 that facilitates encrypted data transfer between components of an image processing system is illustrated. Repetitive description of like elements employed in other embodiments described herein is omitted for brevity. In various implementations as described above, image processing functionality can be divided among multiple isolated VM instances, such as the SVM 310 and PVM 320 shown in system 800. As further shown by FIG. 8, the security component 330 can enforce this isolation between the image capture device 20, the SVM 310, the PVM 320, and the output system 30 by controlling communication between those system elements.

In an aspect, the security component 330 can control communications between elements of system 800 by issuing one-time or single-use encryption and decryption keys to the respective system elements. An example technique that can be utilized by the security component 330 for managing encryption between the elements of system 800 will now be described in further detail with reference to FIG. 8. It is noted, however, that other techniques could also be used by the security component 330 and/or the other elements of system 800.

In response to image capture being initiated at system 800, e.g., a scanned object 410 being positioned at the image capture device 20 and/or the image capture device 20 being powered on or otherwise engaged, the security component 330 can connect to the operating system of the image capture device 20 and facilitate encryption of all outgoing traffic from the image capture device 20 for the present reading session, e.g., by providing a one-time or single-use encryption key to the image capture device 20. After the security component 330 completes an initial screening of the raw data captured by the image capture device 20 (e.g., as described above with respect to FIG. 5), the security component 330 can provide a one-time or single-use password, or other suitable decryption key, to the SVM 310 enable the SVM 310 to decrypt the raw data generated by the image capture device 20.

In response to the SVM 310 completing assembly of the raw data from the image capture device 20, the security component 330 can then provide a new encryption key to the SVM 310, e.g., an encryption key that is distinct from the one provided to the image capture device 20, to facilitate encryption of the assembled image data. In an implementation, the security component 330 can be configured to provide the new encryption key to the SVM 310 in response to further screening of the assembled data being completed by the SVM 310 and/or the security component 330 (e.g., as further described above with respect to FIG. 5). The security component 330 can then provide a second one-time decryption key or password to the PVM 320 to enable processing of the assembled data at the PVM 320, e.g., as described above.

Once the PVM 320 has completed processing of the assembled data provided by the SVM 310, e.g., by forming an output image from the assembled data, the security component 330 can provide a further single-use encryption key to the PVM 320, e.g., an encryption key that is distinct from those provided to the image capture device 20 and the SVM 310, to enable the PVM 320 to encrypt the output image. Additionally, after the PVM 320 generates the output image but before the output image is provided to the output system 30, the security component 330 can analyze the output image to determine whether it contains encoded data corresponding to unauthorized instructions, e.g., using one or more of the techniques described above with respect to FIGS. 6-7. In FIG. 8, this analysis as performed by the security component is illustrated by point 810.

If the security component 330 determines that the output image and/or other data as generated by the PVM 320 does not contain malicious data, the security component 330 can allow the output image and/or other data to proceed past point 810 to the output system 30, e.g., by providing the output system 30 with a single-use password or other decryption key to enable the output system 30 to decrypt and store the output image and/or other data.

Alternatively, if the security component 330 determines (e.g., as described above with respect to FIGS. 6-7) that reading the output image results in the execution of unauthorized instructions, the security component 330 can instead prevent the output image and/or other data generated by the PVM 320 from reaching the output system 30 at point 810. This can be done by withholding the single-use decryption key from the output system 30, thereby preventing the output system 30 from decrypting and storing the output image. As another example, the security component 330 can delete or otherwise discard the output image and/or corresponding data prior to said data reaching the output system 30. Other techniques for preventing access to malicious data by the output system 30 could also be used.

Figure 9:
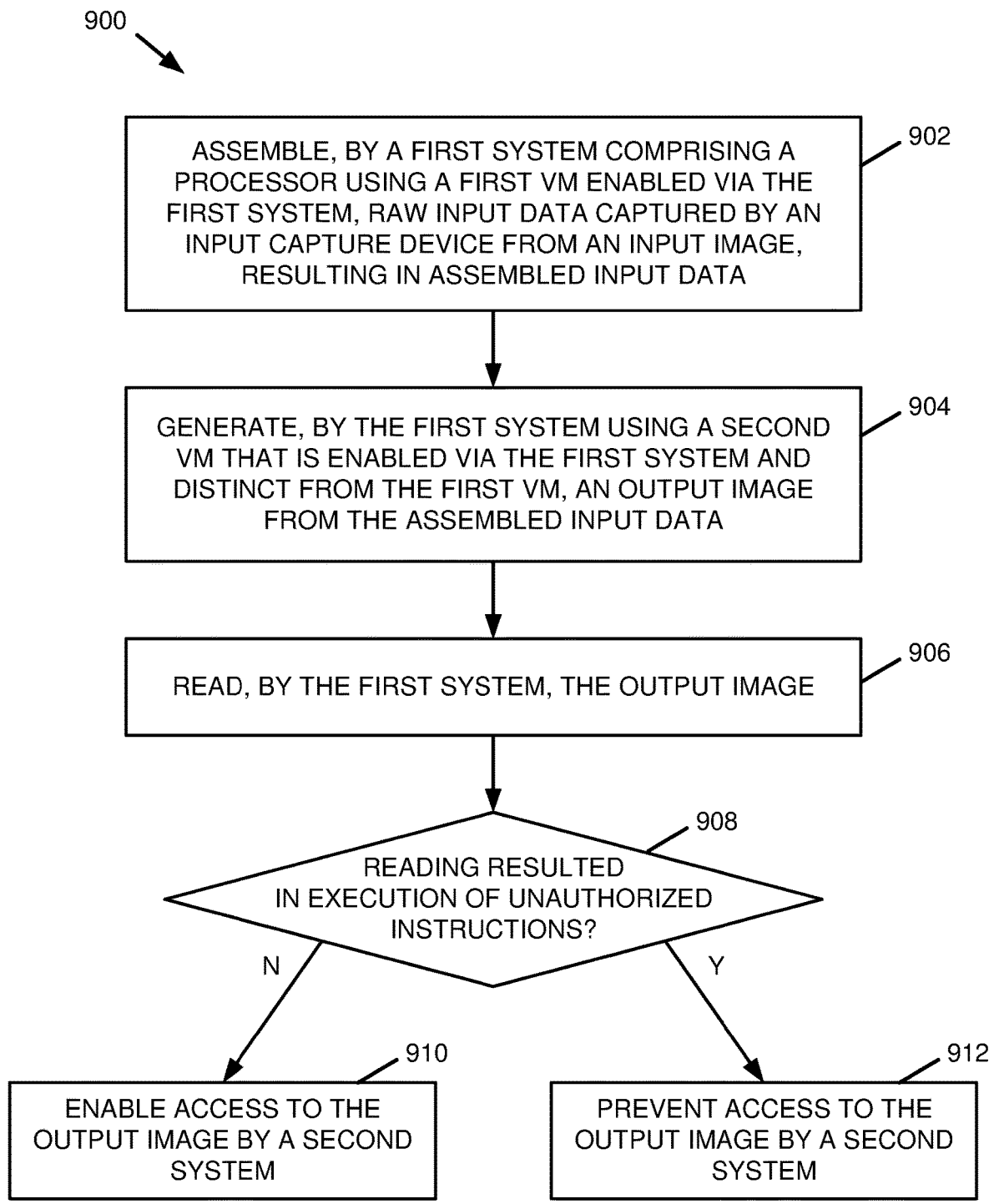
FIG. 9 is a flow diagram of a method that facilitates image processing device security in accordance with various aspects described herein.

With reference to FIG. 9, a flow diagram of a method 900 that facilitates image processing device security is presented. At 902, a first system comprising a processor (e.g., an image processing device 10 comprising a processor 12, and/or a system including such a device) can assemble, using a first VM (e.g., an SVM 310) enabled via the first system, raw input data captured by an input capture device (e.g., an image capture device 20) from an input image (e.g., an image corresponding to a scanned object 410), resulting in assembled input data.

At 904, the first system can generate, by a second VM (e.g., a PVM 320) that is enabled via the first system and distinct from the first VM, an output image from the assembled input data generated at 902 by the first VM.

At 906, the first system can read (e.g., by a security component 330) the output image generated at 904 by the second VM. At 908, the first system can determine (e.g., by a security component as described above with respect to FIGS. 5-7) whether reading the output image, e.g., at 906, results in the execution of unauthorized instructions. If the first system determines at 908 that reading the output image does not result in execution of unauthorized instructions, method 900 can conclude at 910, where the first system can enable (e.g., by the security component 330) access to the output image by a second system (e.g., an output system 30). If, instead, the first system determines at 908 that reading the output image does result in execution of unauthorized instructions, method 900 can instead conclude at 912, where the first system can prevent (e.g., by the security component) access to the output image by the second system (e.g., the output system 30).

FIG. 9 illustrates a method in accordance with certain aspects of this disclosure. While, for purposes of simplicity of explanation, the method is shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 10:
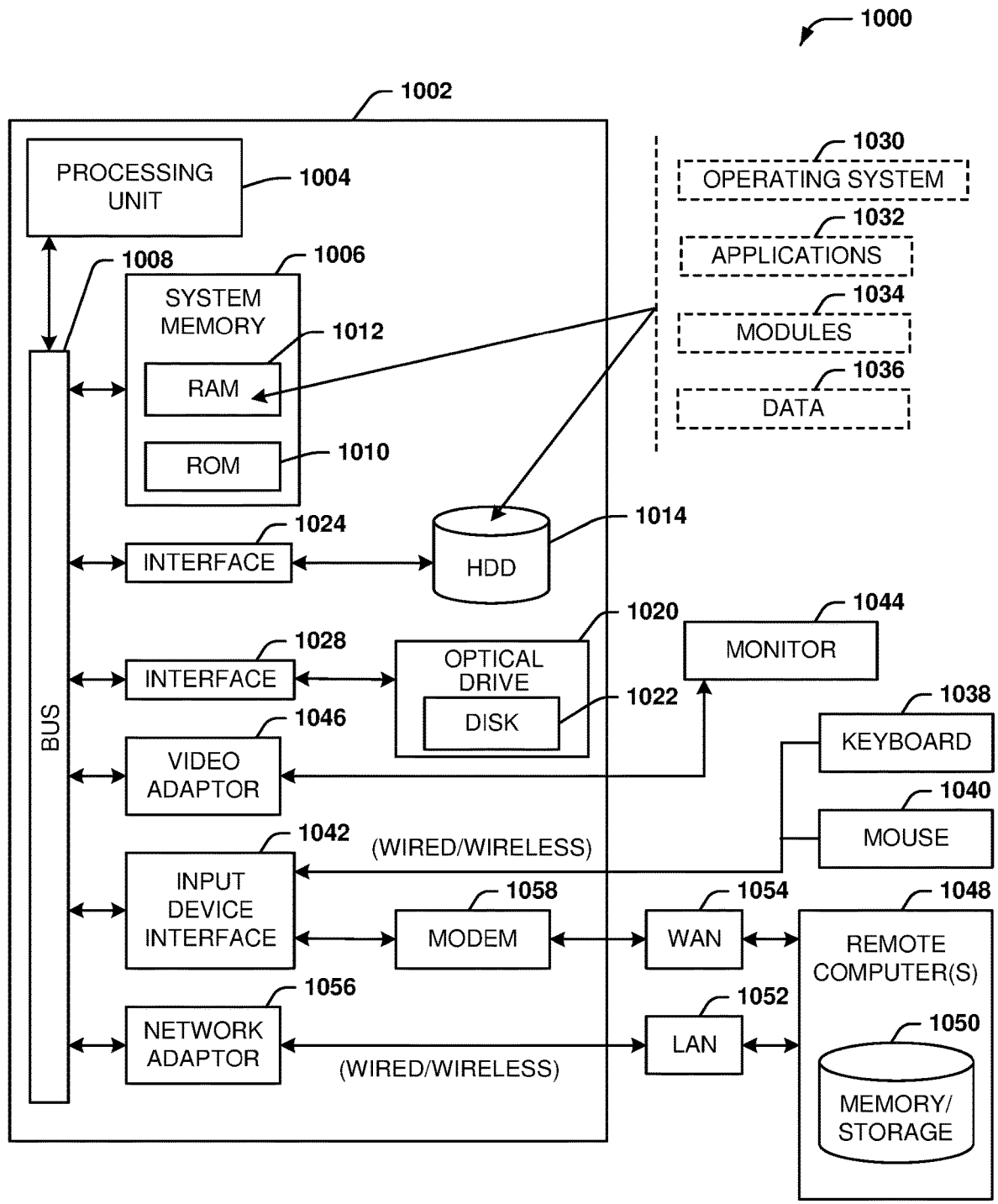
FIG. 10 depicts an example computing environment in which various embodiments described herein can function.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 and an optical disk drive 1020, (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014 and optical disk drive 1020 can be connected to the system bus 1008 by an HDD interface 1024 and an optical drive interface 1028, respectively. The HDD interface 1024 can additionally support external drive implementations via Universal Serial Bus (USB), Institute of Electrical and Electronics Engineers (IEEE) 1394, and/or other interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a USB port, an IR interface, a BLUETOOTH® interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless access point (AP) disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    assembling, by a first system comprising a processor using a first virtual machine enabled via the first system, raw input data captured by an image capture device from an input image, resulting in assembled input data;
    generating, by the first system using a second virtual machine that is enabled via the first system and distinct from the first virtual machine, an output image from the assembled input data;
    reading, by the first system in response to the generating, the output image; and
    preventing, by the first system, a second system, distinct from the first system, from accessing the output image in response to the reading resulting in execution of unauthorized instructions at the first system.

2. The method of claim 1, further comprising:
    determining, by the first system based on the raw input data, whether the input image belongs to an expected image category; and
    preventing, by the first system, the second virtual machine from accessing the assembled input data in response to determining that the input image does not belong to the expected image category.

3. The method of claim 2, wherein the expected image category comprises depictions of genetic sequences.

4. The method of claim 3, wherein the reading comprises reading a genetic sequence, of the genetic sequences, depicted in the output image, and wherein preventing the second system from accessing the output image comprises preventing the second system from accessing the output image in response to the genetic sequence being determined to include encoded data corresponding to the unauthorized instructions.

5. The method of claim 2, wherein the expected image category comprises quick response codes.

6. The method of claim 2, wherein the expected image category comprises printer calibration graphics.

7. The method of claim 1, further comprising:
    recording, by the first system, first configuration data associated with the first system prior to the reading;
    recording, by the first system, second configuration data associated with the first system subsequent to the reading; and
    determining, by the first system, that the reading resulted in the execution of the unauthorized instructions at the first system based on a result of comparing the first configuration data and the second configuration data.

8. The method of claim 1, further comprising:
    providing, by the first system, a single-use encryption key to the second virtual machine; and
    causing, by the first system, the second virtual machine to encrypt the output image using the single-use encryption key before providing the output image to the second system.

9. The method of claim 8, wherein the preventing comprises withholding a single-use decryption key from the second system in response to the reading resulting in the execution of unauthorized instructions at the first system, resulting in the output image being unreadable by the second system.

10. The method of claim 1, wherein the preventing comprises discarding the output image at the second virtual machine prior to the second system accessing the output image.

11. A system, comprising:
    a processor; and
    a memory that stores executable instructions that, when executed by the processor, facilitate performance of operations, comprising:
        assembling, by a first virtual machine enabled via the system, raw data captured by an image capture device from an input image, resulting in assembled image data;
        constructing, by a second virtual machine that is enabled via the system and distinct from the first virtual machine, an output image from the assembled image data;
        reading the output image in response to the output image being constructed; and
        preventing an external system, distinct from the system, from accessing the output image in response to determining that reading the output image results in execution of unauthorized instructions.

12. The system of claim 11, wherein the operations further comprise:
    determining, based on the raw data, whether the input image belongs to an expected class of images; and
    preventing the second virtual machine from accessing the assembled image data in response to determining that the input image does not belong to the expected class of images.

13. The system of claim 12, wherein the expected class of images comprises depictions of genetic sequences.

14. The system of claim 13, wherein the reading comprises reading a genetic sequence, of the genetic sequences, depicted in the output image, and wherein preventing the external system from accessing the output image comprises preventing the external system from accessing the output image in response to the genetic sequence being determined to include encoded data corresponding to the unauthorized instructions.

15. The system of claim 11, wherein the operations further comprise:
    recording first configuration data associated with the system prior to reading the output image;
    recording second configuration data associated with the system subsequent to reading the output image; and
    determining that reading the output image resulted in the execution of the unauthorized instructions based on a result of comparing the first configuration data and the second configuration data.

16. The system of claim 11, wherein the operations further comprise:
    providing a one-time encryption key to the second virtual machine; and
    causing the second virtual machine to encrypt the output image using the one-time encryption key before enabling access to the output image by the external system, wherein preventing the external system from accessing the output image comprises withholding a one-time decryption key from the external system in response to determining that reading the output image results in the execution of the unauthorized instructions.

17. A non-transitory machine-readable medium, comprising executable instructions that, when executed by a processor, facilitate performance of operations, comprising:
    causing a first virtual machine instance to assemble raw input data captured by an image capture device from an input image, resulting in assembled data;

causing a second virtual machine instance, distinct from the first virtual machine instance, to construct an output image from the assembled data;

in response to the second virtual machine instance constructing the output image, reading the output image; and preventing access by a destination system to the output image in response to determining that reading the output image results in execution of unauthorized program code.

18. The non-transitory machine-readable medium of claim 17, wherein the operations further comprise:

determining, based on the raw input data, whether the input image belongs to an expected category of images; and preventing the second virtual machine instance from accessing the assembled data in response to determining that the input image does not belong to the expected category of images.

19. The non-transitory machine-readable medium of claim 18, wherein the expected category of images comprises depictions of genetic sequences, and wherein the operations further comprise:

reading a genetic sequence, of the genetic sequences, depicted in the output image; and preventing the access by the destination system to the output image in response to the genetic sequence being determined to include encoded data corresponding to the unauthorized program code.

20. The non-transitory machine-readable medium of claim 17, wherein the operations further comprise:

recording first system configuration data prior to reading the output image;

recording second system configuration data subsequent to reading the output image; and determining whether reading the output image resulted in the execution of the unauthorized program code based on a result of comparing the first system configuration data and the second system configuration data.

* * * * *